(No Model.)
R. GRISWOLD.
ELEVATOR FOR UNLOADING AND STACKING HAY AND LOOSE GRAIN.
No. 279,939. Patented June 26, 1883.
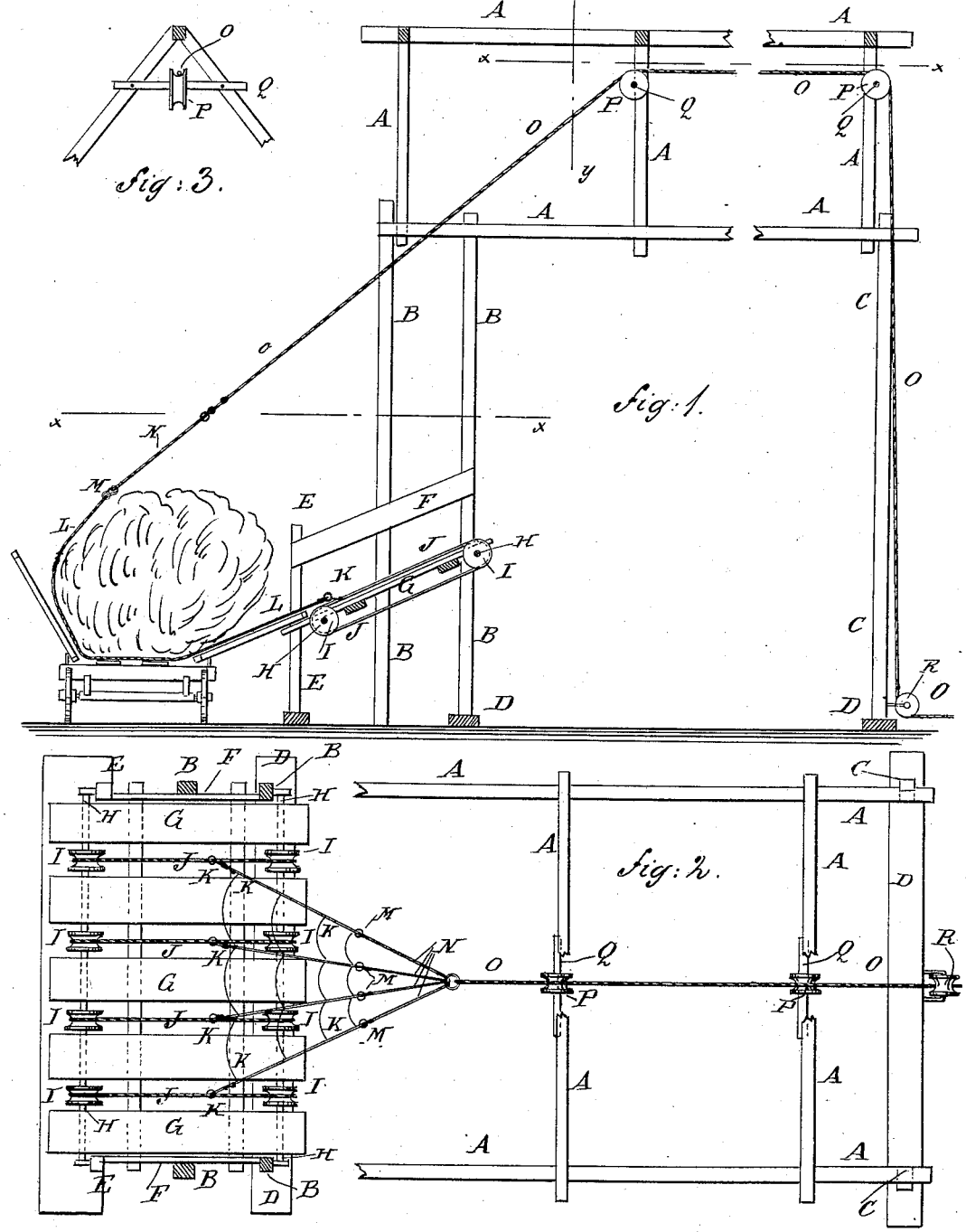
WITNESSES:
Chas. Nida
C. Sedgwick
INVENTOR:
R. Griswold
BY Munn & Co
ATTORNEYS.

UNITED STATES PATENT OFFICE.

ROBERT GRISWOLD, OF WOODEY, KANSAS.

ELEVATOR FOR UNLOADING AND STACKING HAY AND LOOSE GRAIN.

SPECIFICATION forming part of Letters Patent No. 279,939, dated June 26, 1883.

Application filed October 11, 1882. (No model.)

*To all whom it may concern:*

Be it known that I, ROBERT GRISWOLD, of Woodey, in the county of Lincoln and State of Kansas, have invented certain new and useful Improvements in Elevators for Unloading and Stacking Hay and Loose Grain, of which the following is a full, clear, and exact description.

Reference is to be had to the accompanying drawings, forming part of this specification, in which similar letters of reference indicate corresponding parts in all the figures.

Figure 1 is a sectional side elevation of my improvement. Fig. 2 is a sectional plan view of the same after the load is discharged, taken through the broken line $x\,x\,x\,x$, Fig. 1. Fig. 3 is a sectional elevation of a part of the same, taken through the line $y\,y$, Fig. 1.

The object of this invention is to facilitate the unloading and stacking of hay and loose grain.

The invention consists in an elevator for unloading and stacking hay and loose grain, constructed with a frame having at its forward end an inclined platform provided with pulleys and endless ropes, and the hoisting-rope and its guide-pulleys, to adapt it to be used in connection with a netting placed upon a wagon-rack beneath the load for transferring the load from the rack to the stack, as will be hereinafter fully described.

A represents the top frame of the elevator, which is made V or roof shaped, and is supported at its forward end by the posts B and at its rear end by the posts C. The lower ends of the posts B C rest upon the ground, or are attached to sills or base-blocks D, to prevent them from being forced into the ground. The upper ends of the posts B are permanently attached to the frame A; but the upper ends of the posts C are detachably secured to the said frame A, so that they can be detached when the elevator is to be moved forward.

To the forward posts B and to short posts E, placed a little in front of the posts B, and connected therewith by side-boards F, is secured an inclined platform, G, formed by attaching smooth boards at a little distance apart to cross-bars.

To the platform G are attached two rods, H, upon which are placed pulleys I, around which pass endless ropes J.

To the ropes J, or to short ropes secured to the said ropes J, are attached rings K, to receive snap-hooks attached to the edge of a netting, L, used as a lining to a wagon-rack, and upon which the load is placed. The snap-hooks attached to the other edge of the netting L are attached to rings M, attached to the ends of short ropes N, the other ends of which are attached to the end of a rope, O, or to a ring attached to the said end. The rope O passes over pulleys P, placed upon rods Q or other bearings attached to the inclined bars or rafters of the top frame, A, near their upper ends. The rope O also passes around a guide-pulley, R, pivoted to a bearing attached to the sill of the rear posts, C, or other suitable support, and to its end is designed to be attached horses to operate the apparatus, a double pulley being interposed between the guide-pulley R and the point of draft attachment, if desired, to increase the effect of the power applied.

The rack upon which the load is drawn to the elevator should be made with one or both sides detachable, so that the side next the platform can be detached for convenience in removing the load. If desired, the detached side of the rack can be interposed between the base-frame of the rack and the outer edge of the platform G, to serve as a continuation of the said platform.

With this construction, when the apparatus has been connected in the manner hereinbefore described, with the netting placed upon the wagon-rack beneath the load, and power is applied to the end of the rope O, the first effect is to roll the load of hay or grain upon the platform G, and as the application of the power is continued the load is rolled up the platform G and is discharged in a body upon the stack, the endless ropes J and the pulleys I allowing the rear end of the netting to move up the platform until the load has been discharged upon the stack.

By the use of this apparatus the load can be taken off the wagon very quickly and with a very small amount of manual labor, no pitching and no stack-building being required.

Having thus fully described my invention, I claim as new and desire to secure by Letters Patent—

An elevator for unloading and stacking hay and loose grain, constructed substantially as herein shown and described, and consisting of the frame having at its forward end an inclined platform provided with pulleys and endless ropes, and the hoisting-rope and its guide-pulleys, to adapt it to be used in connection with a netting placed upon the wagon-rack beneath the load for transferring the load to the stack, as set forth.

ROBERT GRISWOLD.

Witnesses:
A. U. MARSHALL,
F. L. PRINDLE.